March 19, 1957 P. L. CHELLE 2,785,520
BOTTLE CAPPING
Filed Aug. 17, 1953 6 Sheets-Sheet 1
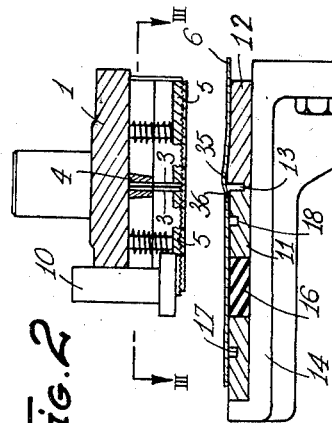
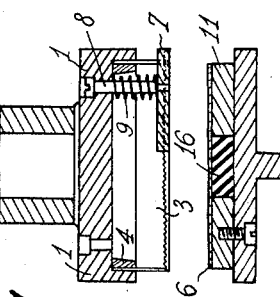
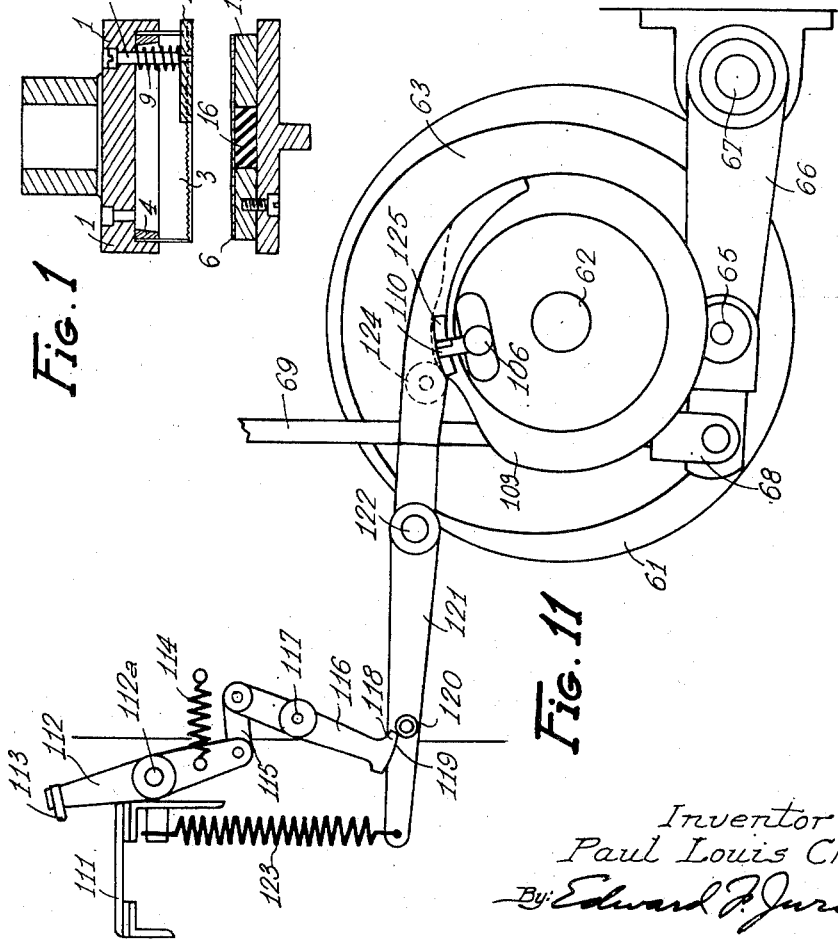
Inventor:
Paul Louis Chelle
By: Edward P. Jurow
Atty.

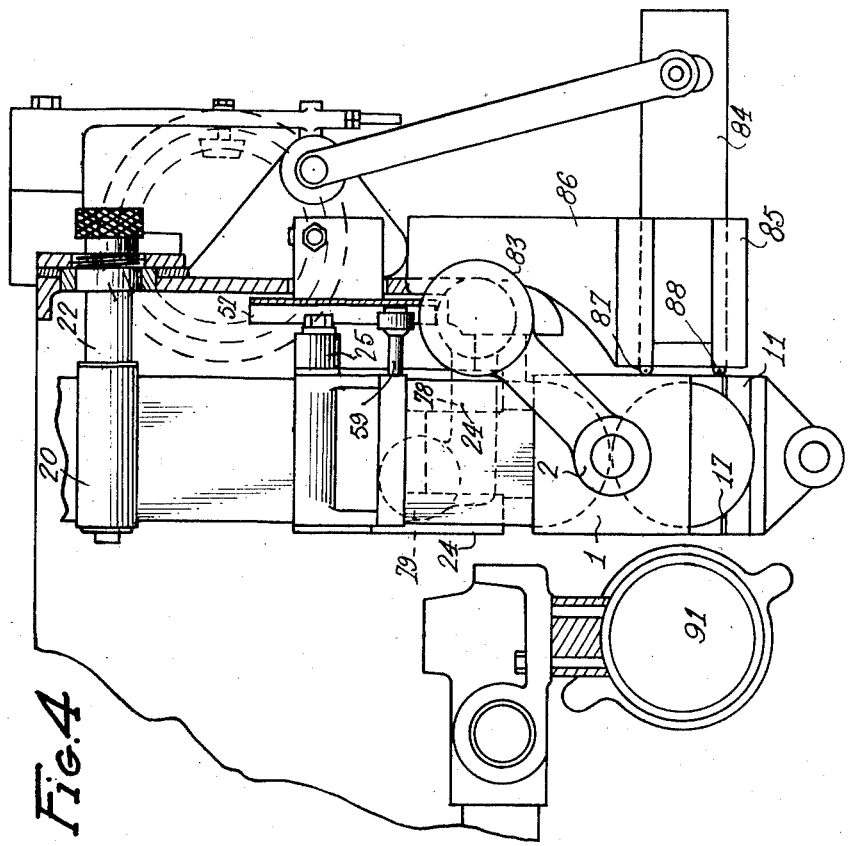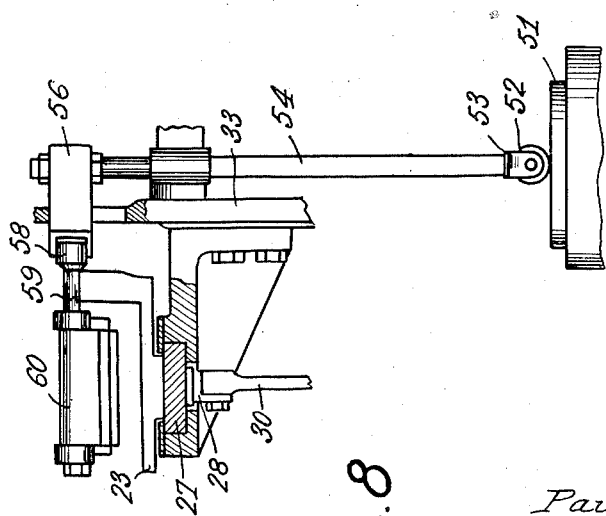

Inventor:
Paul Louis Chelle
By: Edward P. Jurow
Atty.

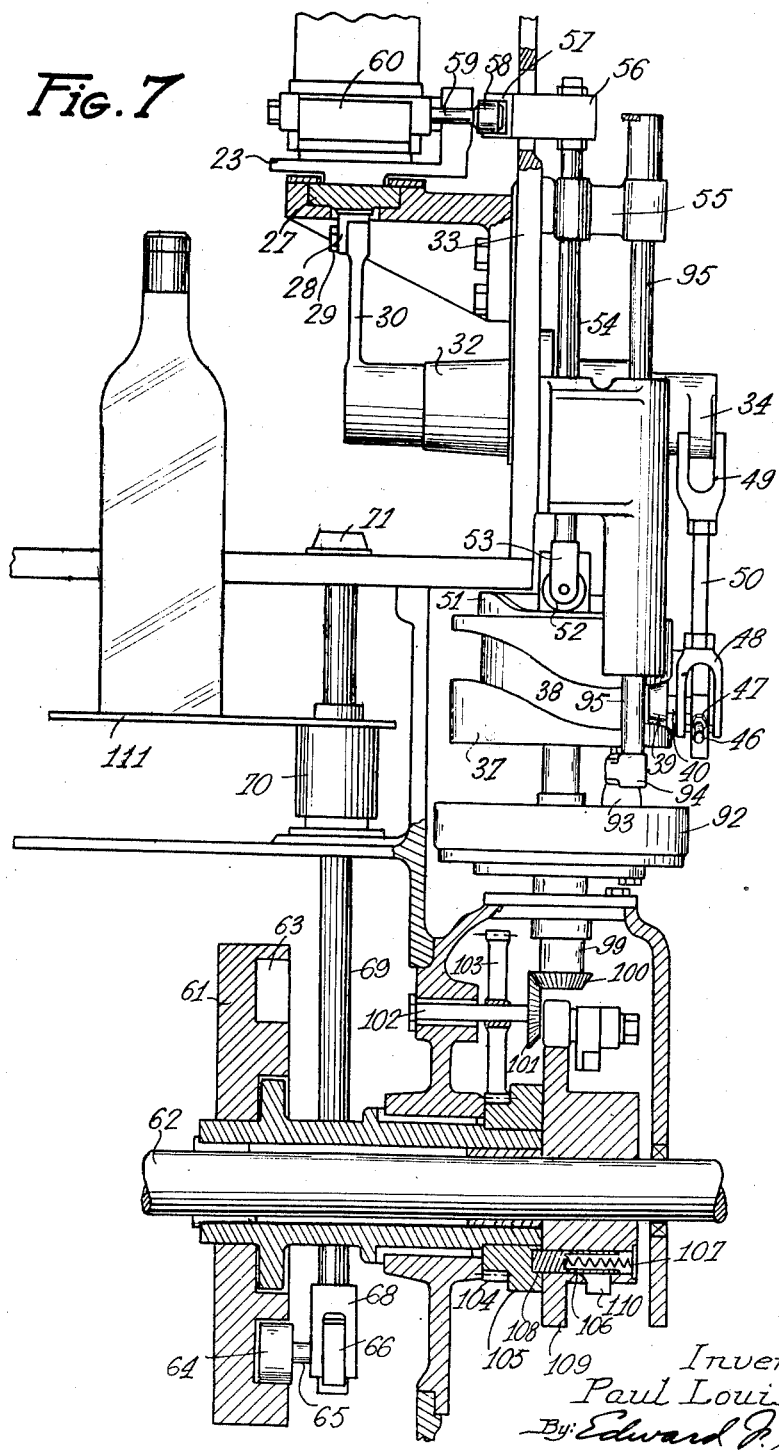

United States Patent Office 2,785,520
Patented Mar. 19, 1957

2,785,520

BOTTLE CAPPING

Paul Louis Chelle, Creteil, France, assignor to Societe du Surbouchage, "Astra," Lyon, Rhone, France Application August 17, 1953, Serial No. 374,594

9 Claims. (Cl. 53—296)

This invention relates to bottle-capping machines and has particular reference to a machine of the type in which the bottle caps are cut and pressed from a strip of ductile metal.

In hitherto known methods of capping bottles and like containers a circular blank is cut from a strip of ductile metal, for instance aluminum, by means of a punch-and-die assembly, and then given its final cap shape by means of a clinching or pressing head of suitable design. With this general procedure the width of the metal strip must be greater than the diameter of the circular blank or disk to be cut, which obviously leads to a substantial loss of material, in mass-production conditions. Besides, after cutting a variable number of blanks, the cutting tool becomes dull and therefore must be re-sharpened and since the strip of metal to be cut has a thickness of the order of one thousandth of an inch or so, this re-sharpening operation must be effected very accurately and frequently.

It is one object of this invention to reduce to a substantial extent the loss of material in cap cutting devices of the type set forth hereinabove, and for this purpose I provide a cutting tool consisting of a punch having two cutting edges of semi-circular shape, tangent to each other on a diameter at right angles to the feeding direction of the strip. Thus, the cutting operation takes place in two strokes, and each time the strip is fed the tool cuts a semi-circular edge of each of two successive blanks. With this procedure it is possible to use strips of a width slightly smaller than the final diameter of the complete circular blank, so that the waste metal will amount to only one piece of metal on either side of the pair of tangent semi-circular cuts.

According to a preferred form of embodiment of the invention, the cutting tool consists of backed-off and sharpened saw blades, for instance similar to wood-cutting saw blades, held inside a supporting plate by means of an inner counterplate formed with a pair of semi-circular grooves tangent with each other and having mounted the aforesaid blades therein, and of a blank presser causing the tool to bear on the strip before the blades engage the metal. Moreover, the tool according to the invention is provided with external movable ejectors which, as the tool effects its inoperative or upward stroke, release the strip from the blades and cause the lateral waste metal pieces cut between two tangent, successive semi-circular cuts to fall, so that they can be removed from the machine. Preferably, the cutting tool has associated therewith a marking punch of the type adapted to be released by the expansion of a spring when the latter is tightened to a predetermined extent. Thus, the blanks cut from the strip are provided at the same time with the trade mark or other sign which is to be carried by the caps fitted on the bottles or like containers during the capping operation.

It is another object of this invention to provide a bottle-capping machine of the type disclosed hereabove, which comprises a device for supporting and feeding the metal strip to the tool, the control mechanism for this device, another control mechanism acting upon the cutting tool, and also a device for introducing the cut blank into the cap clinching head with its control mechanism, these various mechanisms being designed and set to operate synchronously. Preferably, the strip feeding mechanism and the blank introducing mechanism are disconnected from the drive as long as no bottle is positioned beneath the cap fixing head.

According to an advantageous form of embodiment, the strip supporting and feeding device comprises a strip supporting slide adapted to be reciprocated to an extent adjustable in conformity with the pitch corresponding to the diameter of the disk to be cut. This slide is advantageously associated with a resilient follower adapted to hold the strip in the tool feeding movement and to release this strip during the return or inoperative stroke of the slide.

The device for introducing the cut blank into the cap clinching head comprises a sliding plate movably mounted at a higher level than the cutting plate in a fixed slideway, this sliding block being provided with a pair of downward-extending studs adapted to engage two diametrically opposite points on a diameter of the cut blank for conveying the latter to a position beneath the cap clinching head. Preferably, the directions of positive operation of the blank transfer sliding block and of the strip feeding slide are at right angles to each other.

The mechanisms controlling the strip feeding slide, the resilient follower, the cutting tool and the blank transferring device comprise cam-actuated link-and-lever systems, the arrangement comprising one cam per device. According to an advantageous form of embodiment, the cams actuating the slide, the follower and the transfer device consists of bell-shaped members superimposed to one another along a common vertical axis controlled by a single shaft, whilst the cam controlling the blank cutting tool is mounted on the general or main shaft of the machine, which is connected through a clutch device to the common shaft controlling the other three cams, the arrangement being such that this clutch device remains disconnected as long as no bottle is presented beneath the cap clinching head.

According to a further, advantageous form of embodiment of the invention, the connection between the main shaft of the machine and the single shaft actuating the three cams controlling the slide, the follower and the transfer device, consists of a pair of spur wheels mounted on each of these shafts, respectively, the spur wheel of the main shaft being mounted for loose rotation thereon and adapted to be made rotatably fast therewith through a spring-loaded pin mounted on a member rigid with said shaft and engaging a cavity provided in the relevant pinion, a lever being provided for removing this pin from this cavity when a feeler positioned on the path followed by the bottles to be capped is not actuated by the passage of a bottle.

The cap clinching head may advantageously consist of a device of the type described and illustrated in the French Patent No. 1,005,972 filed October 22, 1947 and therefore will not be described herein. Other specific features of the invention will appear as the following description proceeds, in which reference will be made to the attached drawings showing by way of example only the manner in which the invention may be carried out in the practice. In the drawings:

Figure 1 is a vertical, fragmentary cross-sectional view, taken upon the line I—I of Fig. 3, showing the cutting tool and the fixation of the saw blades and outer ejectors.

Figure 2 is a longitudinal section, taken upon the line II—II of Fig. 3, showing the cutting tool and more particularly the upper blade-carrying plate, the inner strip followers, the marking tool and the bottom plate.

Figure 3 is a detail section taken upon the line III—III of Fig. 2, showing notably the relevant positions of the pair of saw blades.

Figure 4 is a fragmentary plan view showing a few details in section, the mechanisms being represented in their respective positions during the cutting of a cap blank.

Figure 7 is a view similar to Fig. 6 but representing the machine as a whole, with a fragmentary section of the lower portion of the machine, the strip cutting device and its control mechanism being removed.

Figure 8 is a view similar to Fig. 7 showing the follower control device after a blank has been cut from the strip.

Figure 11 is a side view showing the lower portion of the machine when no bottle is presented beneath the cap clinching head.

Figure 5:
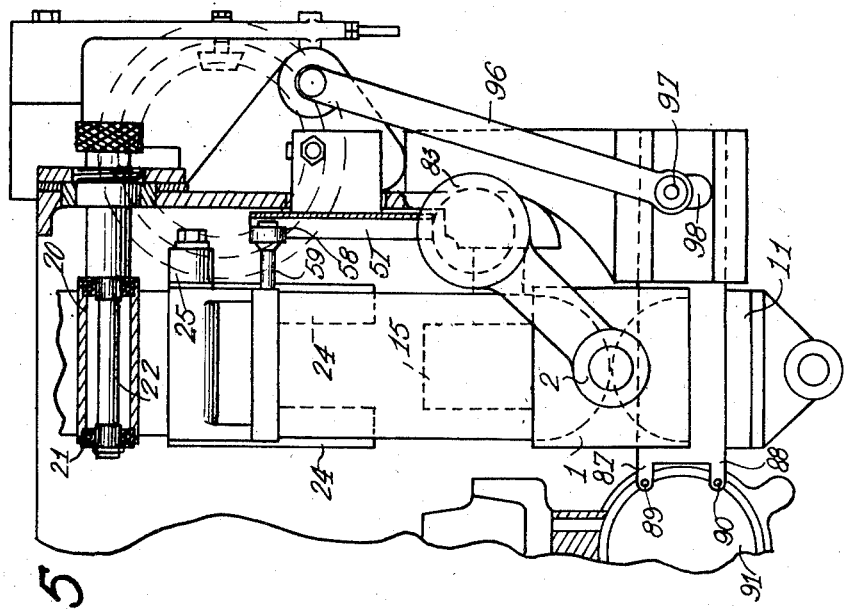
Figure 5 is a plan view similar to Fig. 4 showing the positions of the various parts when the cut blank is about to be introduced into the cap clinching head.

The cutting tool proper, illustrated in Figs. 1 to 3, consists of a rectangular base plate 1 fast with a slide 2 to be described more in detail presently, this slide 2 being reciprocated in the vertical direction. The base plate 1 has milled therein a pair of circular cavities tangent to each other at A. In these cavities are located saw blades 3 held therein by means of inner segments 4. A pair of follower plates 5 movable in the vertical direction project slightly from the lower edges of the saw blades 3 so as to be the first to engage the metal strip 6. A pair of movable ejectors 7 are located in the substantially triangular recesses separating the two saw blades 3. The followers 5 and injectors 7 are guided by the shanks of screws 8 and urged downwards by coil springs 9 threaded on these screws. The purpose of these ejectors is to facilitate from either side of the tangent semi-circular cuts the removal of the waste metal constituted by the substantially triangular pieces ABC and ADE. Moreover, the cutting tool is provided with a marking device 10 of a generally known type.

Figure 10:
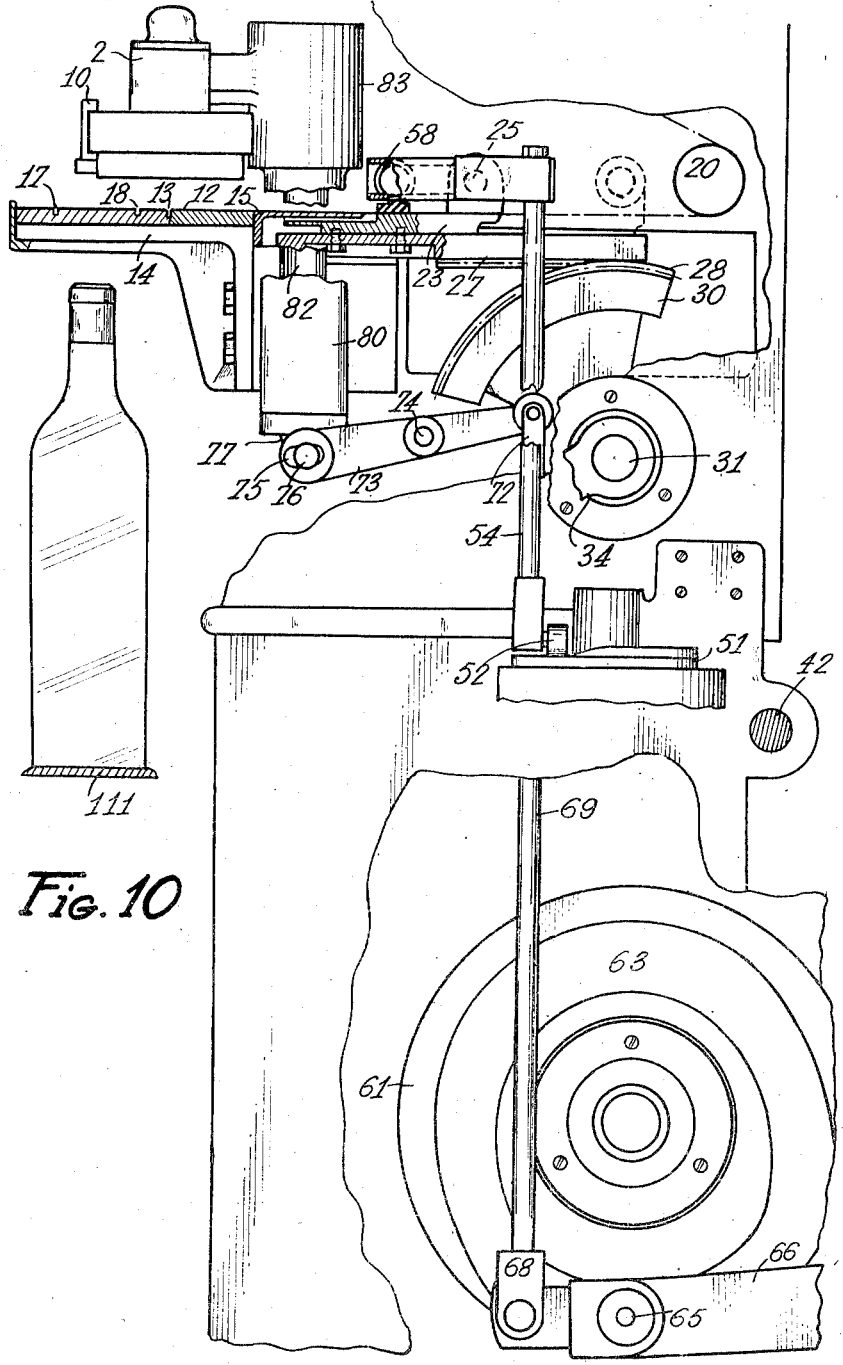
Figure 10 is a view similar to that of Fig. 9, the strip-feeding and blank-transferring mechanisms being removed for the sake of clarity.

The cutting tool is movable toward a lower die consisting of elements such as 11 and 12 having formed therebetween a pair of semi-circular, tangent grooves 13 adapted to receive the saw blades 3 on completion of the cutting stroke. These elements 11, 12 are supported by a fixed bracket 14 formed with a rear extension 15 (Figure 10) of inverted L-shape, intended to support the strip 6 during its feed movements. The element 11, on which the cut blank is supported, is provided with a central pad 16 of resilient material such as rubber, intended to cooperate with a marking device 10. This element 11 is also formed with a pair of transverse rectilinear grooves 17 and 18 for a purpose to be explained presently.

With the above-described cutting tool the cap blank is formed in two successive operations; in the first operation the terminal or trailing semi-circular cut EAB of a blank 19 is effected, and, simultaneously therewith, the first or leading semi-circular cut DAC of the next blank. During the second operation, after the strip 6 has been fed through the pitch distance (corresponding to the width of one blank), the metal is cut along the semi-circular line EAB which constitutes the terminal cut of the blank previously cut along the semi-circular line DAC, and also along the leading semi-circular cut of the next blank, following the semi-circular line DAC. With this method it is possible to use strips 6 the width of which is slightly smaller than the diameter of the circle representing a blank, so that the lateral waste metal pieces ABC and AED are not connected with each other nor with similar pieces cut either beforehand or subsequently; and this obviously leads to a substantial decrease in production cost.

The device for supporting the strip and feeding same to the cutting tool comprises a small roller consisting of a cylindrical member 20 (Figure 5) mounted through the medium of ball- or like bearings 21 on a shaft 22 secured on the frame of the machine. This stationary roller is associated with a slide 23 carrying a follower-presser 24 pivotally mounted on a shaft 25. This slide 23 is secured on a toothed sliding block 27 adapted to be reciprocated by means of a toothed segment 28 formed in a curved angle-iron fastened through bolts 29 to a segment 30 rigid with a shaft 31 pivotally mounted in a bracket 32 secured on the frame 33 of the machine. This shaft 31 carries at its opposite end a lever 34 for a purpose to be defined presently. The slide 23 cooperates with the angle member 15 in holding the strip during the forward travel thereof.

On the other hand, to prevent the edge of the strip from engaging the circular grooves 13, the inner edge 35 of the circular groove positioned near the front or leading edge of the strip is slightly higher than the outer edge 36 (see Fig. 2).

Figure 9:
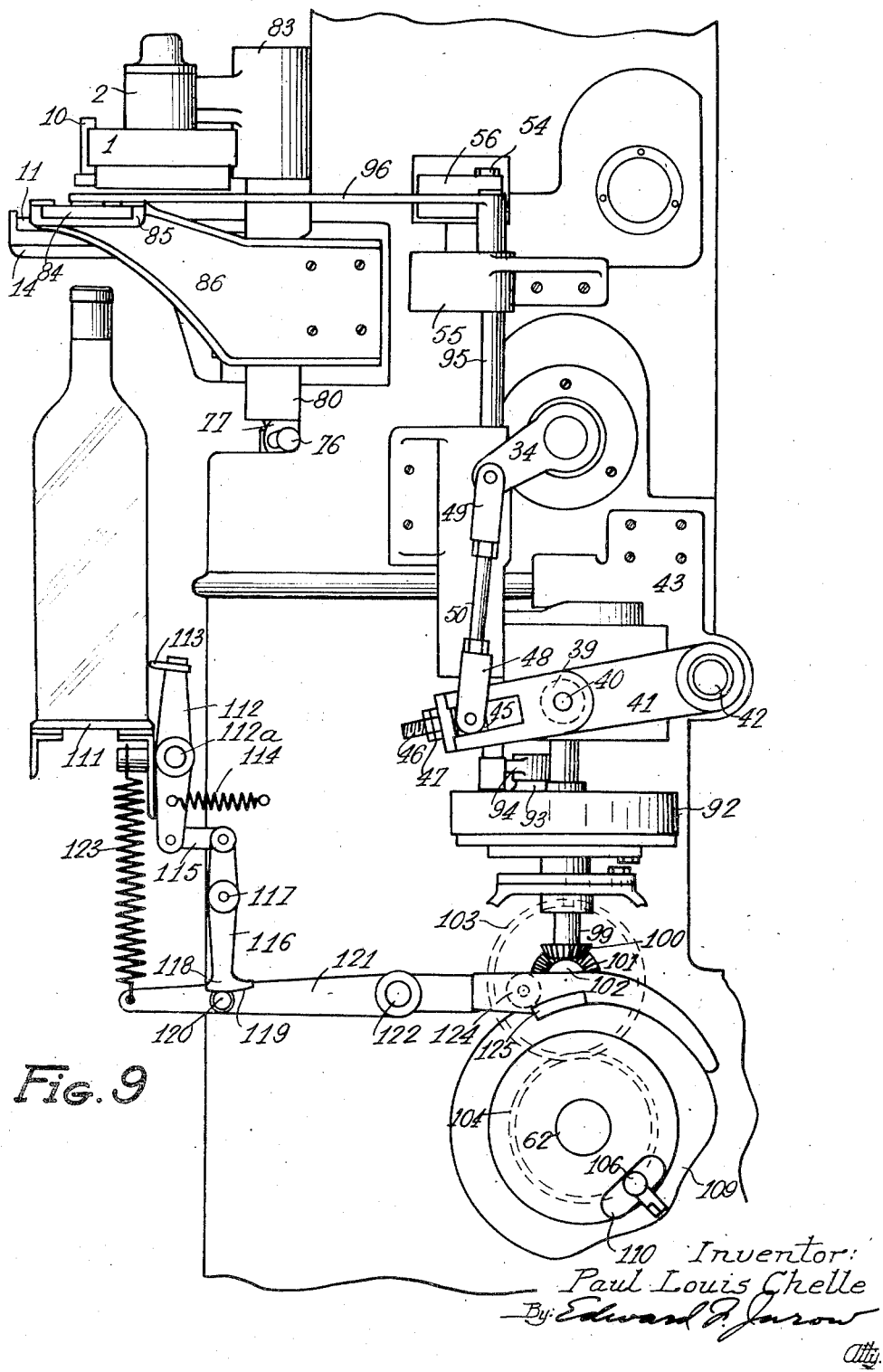
Figure 9 is an external lateral view of the machine, with the devices in the positions they occupy at the beginning of the downward stroke of the cutting tool.

The slide-actuating mechanism comprises a cam 37 formed with a helical groove 38 engaged by a roller follower 39 carried by a pin 40 secured to a lever 41 pivotally mounted at 42 on a bracket 43 rigid with the machine frame (Figures 7 and 9). The aforesaid lever 41 is formed at its free end with a slot 44 slidably engaged by a slide block 45 the position of which can be adjusted through the medium of a screw-threaded shank 46 and nuts 47. On this block is pivotally mounted a yoke 48 connected through a longitudinally adjustable rod 50 to another yoke 49 hingedly connected to the lever 34.

The follower 24 is coupled to a control device comprising a cam 51 engaged by a roller 52 mounted in a yoke 53 rigid with a rod 54 slidably mounted in a bracket 55 secured to the machine frame 33 (Figure 7). This rod 54 carries at its upper end a horizontal support 56 formed with a U-shaped slideway 57 adapted to be engaged by a roller 58 secured to pin 59 which is carried by the member 60 supporting the presser fingers 24.

Figure 6:
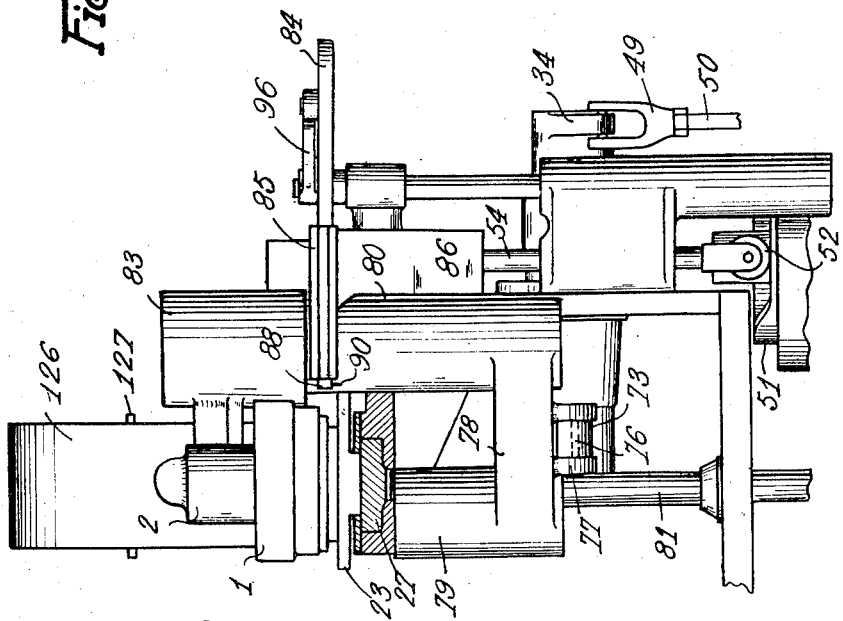
Figure 6 shows the outer face of the upper portion of the machine, with the devices in the positions they occupy when the cutting tool is about to be lowered.

The mechanism for vertically reciprocating the tool-carrying slide 2 comprises a cam 61 keyed on the main shaft 62 of the machine (Figure 7); this cam is formed with a cam groove 63 engaged by a roller 64 carried by a pin 65 mounted on a lever 66 pivotally mounted at 67 on the machine frame (Figure 11). This lever 66 is formed with an extension carrying a yoke 68 attached to a rod 69 guided in sockets 70, 71 (Figure 7); this rod 69 is pivotally connected through a yoke 72 (Figure 10) to a lever 73 fulcrumed on a fixed pin 74. The other end of this lever 73 is formed with a slot 75 engaged by a pin 76 extending through a yoke 77 provided in a sliding block 78 (Figure 6) formed with two guiding elements 79 and 80 engaged by slide rods 81 and 82. Overlying the guiding element 80 is the guide member 83 of the tool-carrying slide 2.

The device for introducing the cut blank into the cap-clinching head comprises a sliding plate 84 movable in a slideway 85 provided in a bracket 86 secured to the machine frame. The sliding plate 84 is formed (see Figs. 4 and 5) with a pair of front lugs 87, 88 in which corresponding pins 89 and 90 are fitted (see also Fig. 6). The level at which the sliding plate 84 is movable in the slideway 85, as will be seen in Fig. 9, is higher than the plane of the cutting plate constituted by the elements 11 and 12. As a result, when the sliding plate is moved toward the cap-clinching head 91 the pins 89 and 90 may slide in the grooves 17 and 18.

The mechanism controlling the transfer of the cut blanks comprises a bell-shaped cam 92 engaged internally by a roller carried by a supporting member 93 mounted in turn on a lever 94 attached endwise of a rod 95 held by the supporting bracket 55 and carrying at its upper end a lever 96 fulcrumed on a pin 97 mounted in a transverse slot 98 formed in the sliding plate 84.

The cams 92, 37 and 51 are mounted and superposed in this order on a common shaft 99, a bevel pinion 100 being keyed on this shaft, as shown more particularly in Figs. 7 and 9. This bevel pinion 100 meshes with another bevel pinion 101 carried by an intermediate shaft 102 having a spur wheel 103 keyed thereon. This toothed wheel 103 meshes in turn with a spur pinion 104 keyed on a sleeve member 105 loosely mounted on the main shaft 62 of the machine, this sleeve member being driven for rotation with the main shaft through a driving pin 106 urged by a compression spring 107 for engagement in a cavity 108 formed in the sleeve member 105. This pin 106 carried by a cam 109 is formed with a ramp-like projection 110.

The driving connection between the cam 109 and the pinion 104 takes place when the pin 106 engages the cavity 108, and these two elements are discconnected when the driving pin 106 is extracted from the cavity 108 against the resistance of the compression spring 107. These two positions of pin 106 correspond on the one hand to the case wherein a bottle or like container is fed beneath the cap-clinching head (in which the pin 106 engages the cavity 108), and on the other hand to the case wherein no bottle is positioned beneath the cap-clinching head (in which the pin 106 is extracted from the cavity 108), respectively.

This operation is obtained by means of the device represented in the lower portion of Fig. 9, showing the bottle in position, and in Fig. 11, showing the positions of the same components when no bottle is present. On the path 111 followed by the bottles to be capped a lever 112 provided with a feeler 113 overlying the path is fulcrumed on a fixed pin 112a. This lever 112 is normally urged in this position by a tension spring 114. The opposite end of the lever 112 is connected through a link 115 to another lever 116 fulcrumed on a pin 117, the other end 118 of this lever 116 being formed with a cam element 119 adapted to engage a roller 120. This roller 120 is mounted in turn on a lever 121 fulcrumed at 122 about a fixed pin and urged by a tension spring 123. The other arm of this lever carries a roller 124 adapted to engage the peripheral contour of the cam 109 and a side ramp 125 adapted to engage the ramp formed on the outer projection 110 of the driving pin 106.

This selector operates as follows:

When a bottle is brought to the position in which it lies beneath the cap-clinching head (see Fig. 9), during its movement along the path 111 it causes the lever 112 to pivot about its fulcrum 112a in the clockwise direction, thereby driving the lever 116 in the anticlockwise direction so that the cam element 119 will act upon the roller 120 and cause the lever 121 to oscillate against the resistance of the tension spring 123 and move the roller 124 away from the cam 109 and the ramp 125 away from the projection 110 of pin 106. This pin 106 remains therefore in the cavity 108, thereby causing the shaft 99 carrying the three cams 92, 37 and 51 to be driven, and setting the machine in motion.

On the other hand, if no bottle travels past the feeler 113, as in the case of Fig. 11, the lever 112 is caused to pivot about its fulcrum 112a by the spring 114 until it abuts against the side edge of the path 111. During this movement, the lever 116 is tilted about its fulcrum 117, the cam element 119 releases the roller 120 and, due to the pull exerted by the spring 123, the lever 121 is pivoted about its fulcrum 122 until the roller 124 engages the cam 109. When the latter rotates, the ramp 125 acts upon the projection 110 and forces the pin 106 out of the cavity 108. The pinion 104 is thus disconnected and the shaft 99 is not driven. As a result, the cutting mechanism controlled by the cam 61 carried by the main shaft 62 of the machine will run light.

The operation of the selector mechanism having thus been described, the operation of the blank cutting and transferring mechanisms is as follows:

From the position shown in the figures, in which the cutting tool is ready to fall onto the strip, the material used for making the bottle caps is in the form of a roll 126 carried by a pin 127 mounted on the machine. The strip is unreeled over the small fixed roller 20, passes on the slide 23 on which it is held by the follower 24, and terminates with a semi-circular front or leading edge 19 resting on the die of the cutting tool. At this time, all the parts of the machine are positioned as shown in Figs. 1 to 4, 6, 7, 9 and 10.

The cam groove 63 of cam 61 carries along the roller 64 and the rising movement thereof causes the rod 69 to move upwards on account of the pivotal movement of lever 66 about its fulcrum 67. As a result, the slot 75 formed in the lever 73 and, therefore, the guide 78 of the tool-carrying slide 2 are both moved downwards. Thus, the followers 5 engage and press the strip, and subsequently the saw blades 3 cut the arcs EAB and DAC. At this time, due to the contour of the cam groove 63, a reverse i. e. downward movement of the roller 64 occurs, and the assembly consisting of the slide 2 and guide member 78 is raised. The ejectors 9 eject from the machine the waste metal pieces ABC and ADE so that the cutting plate will carry only one circular blank and the semi-circular front edge of the next blank.

During the raising movement of the cutting tool, the slide 23 recedes under the influence of the cam 37 which lifts the roller 39 on the cam contour 38, thereby tilting the lever 41 upwards about its fulcrum 42 and, therefore, the lever 34, also upwards, through the medium of the rod 50. The toothed segment 28 rotates in the clockwise direction and drives the toothed slide 27 fast with the slide 23.

At the same time, due to the contour of the cam 51, the other rod 54 is raised and moves in the upward direction the supporting member 56 fast therewith, so that the slideway 57 engaged by the roller 58 will also be raised. As a result, the presser fingers 24 are lifted above the slide, as shown in Fig. 8, and as they are carried along by this slide during its backward movement they are then guided by the roller 58.

Meanwhile, the cam 92 causes the lever 94 to tilt, thereby pivoting the rod 95 and therefore the lever 96. The latter moves from the position of Fig. 4 to that shown in Fig. 5. During this movement it carries along the sliding plate 84 which slides in the fixed slideway 85. The pins 89 and 90 secured in this sliding plate engage the grooves 17 and 18 formed in the die plate of the tool and guide the transfer movement of the cut blanks toward the cap-clinching head 91. Then still under the control of this cam 92, the lever 96 is restored to the position indicated in Fig. 5, thus displacing the sliding plate 84 and releasing the die of the cutting tool.

The cam 51 causes the rod 54 to move downward and this movement is also effected by the presser fingers 24 which engage the metal strip from the guide roll 20. At the same time, the other cam 37 causes the lever 41 to oscillate in the anti-clockwise direction as seen in Fig. 9, thus moving the lever 34 in the same direction and the toothed segment 28 in the anti-clockwise direction; as a result, the toothed slide 27 and the slide 23 fast therewith are brought back to their initial position. Thus, the machine has completed a full cycle of operation.

In order to obtain an exact pitch, that is to say, the displacement of the slide 23 to an extent corresponding exactly to the dimension of the blank which is to constitute the cap, this displacement may be adjusted by modifying the position of the slide block 45 in the slot 44 of lever 41 by means of the nuts 47 engaging the screw-threaded shank 46.

Of course, many modifications may be brought to the apparatus shown by way of example only, without departing however from the spirit and scope of the invention as set forth in the appended claims.

What I claim is:

1. A bottle-capping machine of the type in which the bottle caps are cut from a strip of ductile metal and clinched over a bottle by means of a clinching head, comprising, in combination, a cutting tool adapted to cut metal blanks from a metal strip, means for controlling said cutting tool, a strip supporting slide, means for reciprocating said supporting slide, means for controlling said reciprocating means, means for adjusting said reciprocation means to an extent in accordance with the pitch corresponding to the diameter of the metal blank to be cut, a resilient follower pivotally mounted on said supporting slide, means for applying said follower on the metal strip in the cutting tool feeding movement, and means for disengaging the strip from said follower during the return stroke of the slide, means for controlling said applying and disengaging means, a sliding plate movably mounted at a higher level than the cutting plate of the cutting tool, a fixed slideway guiding said sliding plate and a pair of downward-extending studs carried by said sliding plate and adapted to engage two diametrally opposite points on a diameter of the cut blank for conveying the latter to a position beneath the cap clinching head, means for controlling said sliding plate, and a driving means for operating said controlling means in timed relationship.

2. A bottle-capping machine, according to claim 1, wherein the driving means comprise cam actuated link-and-lever systems, one cam per controlling means.

3. A bottle-capping machine, according to claim 2, wherein the driving means comprises three bell-shaped cams superimposed to one another along a common vertical axis and respectively adapted to operate the feeding slide, the follower and the introducing sliding plate, a common shaft carrying said bell-shaped cams, a cam controlling the blank cutting tool and mounted on the main shaft of the machine, a clutch device connecting said main shaft to said common shaft, and means for disconnecting said clutch device as long as no bottle is presented beneath the cap clinching head.

4. A bottle-capping machine, according to claim 3, wherein the clutch device and the means for disconnecting the same comprise a pair of spur wheels respectively mounted on the main shaft and on the common shaft, the spur wheel mounted on the main shaft being mounted for loose rotation thereon and formed with a cavity, a member rigid with said main shaft, a spring-loaded pin mounted on said member and adapted to engage said cavity, a lever pivotally mounted on one side of the path followed by the bottles, a feeler carried by said lever, a tension spring normally urging said lever so that said feeler projects over said path, and means for engaging said pin into said cavity when said feeler projects over said path and for disengaging said pin from said cavity when said feeler is displaced by a bottle following said path.

5. A bottle-capping machine, according to claim 4, wherein the engaging and disengaging means comprises a lever pivotally mounted on the machine and one end of which is connected to the feeler carrying lever whilst its other end is formed with a cam element, a second lever pivotally mounted on the machine, a roller carried by one arm of said second lever for engaging said cam element, a tension spring urging said roller against said cam element, and a second roller carried by the other arm of said second lever and adapted to engage the peripheral contour of the cam controlling the blank cutting tool, said second arm being further formed with a side ramp adapted to engage a ramp formed on an outer projection of the spring-loaded pin.

6. A bottle-capping machine of the type in which the bottle caps are cut from a strip of ductile metal and clinched over a bottle by means of a clinching head, comprising means for cutting a metal strip, means for supporting and feeding the metal strip to said cutting means, means for introducing the cut blank into the cap clinching head, and means for controlling said various means in timed relationship, a resilient follower pivotally mounted on said supporting slide, means for applying said follower on the metal strip in the cutting tool feeding movement, and means for disengaging the strip from said follower during the return stroke of the slide.

7. A bottle-capping machine of the type in which the bottle caps are cut from a strip of ductile metal and clinched over a bottle by means of a clinching head, comprising means for cutting a metal strip, means for supporting and feeding the metal strip to said cutting means, means for introducing the cut blank into the cap clinching head, and means for controlling said various means in timed relationship, the introducing means comprising a sliding plate movably mounted at a higher level than the cutting plate of the cutting tool, a fixed slideway guiding said sliding plate and a pair of downward extending studs carried by said sliding plate and adapted to engage two diametrically opposite points on a diameter of the cut blank for conveying the latter to a position beneath the cap clinching head.

8. A bottle-capping machine according to claim 7 wherein the directions of positive operation of the sliding plate and of the strip feeding device are at right angles to each other.

9. A cutting tool for cutting circular blanks from a strip of ductile metal, more particularly for bottle-capping machines of the type disclosed, comprising a punch having two cutting edges of semi-circular shape and tangent to each other on a diameter at right angles to the feeding direction of the strip, and a die having a pair of grooves complementary to the punch cutting edges, whereby strips of a width slightly smaller than the final diameter of the complete circular blanks may be used for obtaining such circular blanks by a cutting operation taking place in two strokes.

References Cited in the file of this patent

UNITED STATES PATENTS

| Number | Name | Date |
|---|---|---|
| 1,625,403 | Stevens | Apr. 19, 1927 |
| 1,879,555 | Simmons | Sept. 27, 1932 |
| 2,109,854 | Wilcox | Mar. 1, 1938 |
| 2,118,710 | Lowry | May 24, 1938 |
| 2,314,918 | Baule | Mar. 30, 1943 |
| 2,564,434 | Holt | Aug. 14, 1951 |
| 2,621,842 | Burdin | Dec. 16, 1952 |
| 2,667,998 | Enock | Feb. 2, 1954 |
| 2,684,192 | Burdin | July 20, 1954 |

FOREIGN PATENTS

| Number | Country | Date |
|---|---|---|
| 649,048 | Germany | Aug. 16, 1937 |